United States Patent
Abe

(10) Patent No.: US 7,433,446 B2
(45) Date of Patent: Oct. 7, 2008

(54) IMAGE CAPTURING APPARATUS, CONTROL METHOD THEREOF, PROGRAM, AND IMAGE CAPTURING SYSTEM

(75) Inventor: Masahiro Abe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 169 days.

(21) Appl. No.: 11/461,810

(22) Filed: Aug. 2, 2006

(65) Prior Publication Data

US 2007/0029492 A1     Feb. 8, 2007

(30) Foreign Application Priority Data

Aug. 5, 2005   (JP)   ............................. 2005-228476

(51) Int. Cl.
*H05G 1/56* (2006.01)
(52) U.S. Cl. ...................................... 378/114; 378/116
(58) Field of Classification Search ............... 378/98.8, 378/114–116; 250/370.09, 370.11
See application file for complete search history.

(56) References Cited

U.S. PATENT DOCUMENTS

2006/0017028 A1*  1/2006  Ohara et al. ................. 250/580
2008/0029707 A1*  2/2008  Kari et al. .............. 250/370.09

FOREIGN PATENT DOCUMENTS

JP          2002-199290          7/2002

* cited by examiner

*Primary Examiner*—Jurie Yun
(74) *Attorney, Agent, or Firm*—Cowan, Liebowitz & Latman, P.C.

(57) ABSTRACT

An image capturing apparatus includes an image sensing unit that receives X-rays and converts the received X-ray signal into an image signal, a control unit that controls the image capturing apparatus, including image capturing using the image sensing unit, and a communication unit including at least two communication interfaces to output the acquired image signal.

10 Claims, 6 Drawing Sheets

IMAGE CAPTURING APPARATUS, CONTROL METHOD THEREOF, PROGRAM, AND IMAGE CAPTURING SYSTEM

BACKGROUND OF THE INVENTION

1. Field of the Invention

The present invention relates to an image capturing apparatus having a solid-state image sensing element with sensitivity to X-rays, a control method thereof, a program, and an image capturing system comprising the image capturing apparatus.

2. Description of the Related Art

Presently, various inspection apparatus such as a simple X-ray imaging apparatus, CT (Computed Tomography), and MRI (Magnetic Resonance Imaging) are present in the medical field, and "diagnostic imaging" is brisk in which diagnosis is done using images obtained from these inspection apparatus. In angiography, an X-ray moving image is displayed on a monitor in real time, thereby checking a contrast medium flowing in blood vessels.

Conventionally, such image capturing is performed by using an II (Image Intensifier). However, X-ray sensors (e.g., flat panel detectors) using solid-state image sensing elements are coming along in recent years and are used not only for still image capturing but also for moving image capturing.

The images captured by such an X-ray imaging apparatus are transferred to a control PC, and the diagnostic imaging is realized by the control PC.

In an arrangement disclosed in, e.g., Japanese Patent Laid-Open No. 2002-199290, rapid image data transfer is implemented by connecting an X-ray imaging unit to a control PC by an optical fiber cable.

In image capturing using a sensor such as a flat panel detector, as described above, still image capturing such as general chest part image capturing as before is executed. This image capturing is also used for moving image capturing such as IVR (interventional radiology). That is, still images (captured images) and moving images (fluoroscopic images) can be obtained by using a single sensor. Image data acquired by the sensor are output by using a single communication interface regardless of whether they are still images (captured images) or moving images (fluoroscopic images).

A communication interface used in a system under such an image capturing environment is normally a wire interface. For this reason, it is sometimes difficult to separately acquire still image data and moving image data or manage the wire network. However, the existing arrangement is incapable of building a flexible system that can use a wireless interface in place of a wire interface. In addition, if communication using only one communication channel is disconnected during data transfer, the data transfer cannot be resumed until the communication channel recovers.

The above-described arrangement disclosed in Japanese Patent Laid-Open No. 2002-199290 examines how rapidly one can transfer ever-increasing image data to the control PC (Personal Computer). Hence, there is no mention of usage of multiple communication interfaces and flexible switching of communication interfaces in accordance with the image capturing method or image type.

As described above, image data obtained by the conventional image capturing apparatus is output from a single communication interface independently of the image capturing method and image type. Hence, the system cannot flexibly be built in accordance with the user's purpose.

SUMMARY OF THE INVENTION

The present invention has been made to solve the above-described problem and relates to an image capturing apparatus capable of building a more appropriate image capturing system in accordance with an image capturing method and image type, a control method thereof, and a program.

According to the present invention, the foregoing object is attained by providing an image capturing apparatus having a solid-state image sensing element with sensitivity to X-rays, comprising: image sensing means for receiving X-rays and converting the received X-ray signal into an image signal; control means for controlling the image capturing apparatus, including image capturing using the image sensing means; and communication means including at least two communication interfaces to output the image signal acquired by the image sensing means.

In a preferred embodiment, the apparatus further comprises: setting means for setting an image capturing mode; and switching means for switching the communication interface to be used to output the image signal in the communication means.

In a preferred embodiment, the apparatus further comprises switching means for switching the communication interface to be used to output the image signal in the communication means in accordance with comparison between a threshold value and an amount of data acquired by the image sensing means per unit time.

In a preferred embodiment, the apparatus further comprises switching means for switching the communication interface to be used to output the image signal in the communication means in accordance with comparison between a threshold value and the number of images acquired by the image sensing means per unit time.

In a preferred embodiment, the communication interface includes at least one wire communication interface and at least one wireless communication interface.

In a preferred embodiment, when communication is disconnected during use of one communication interface in the communication means, the control means switches the communication interface to the other communication interface.

In a preferred embodiment, the communication means has a structure capable of attaching a communication cable to the wire communication interface, and the control means comprises determination means for determining on the basis of an attached state of the communication cable connected to the wire communication interface whether the wire interface can be used, and inhibition means for inhibiting image capturing by the image sensing means on the basis of a determination result from the determination means.

In a preferred embodiment, a wireless module of the wireless communication interface has a structure capable of executing wireless communication while maintaining a predetermined distance from an object of the image capturing apparatus.

In a preferred embodiment, the apparatus further comprises threshold value setting means for setting the threshold value.

In a preferred embodiment, the apparatus further comprises threshold value setting means for setting the threshold value.

According to the present invention, the foregoing object is attained by providing an image capturing system comprising an image capturing apparatus of claim 1, comprising: an X-ray generation unit adapted to irradiate an object with X-rays; an image capturing control unit adapted to control the X-ray generator and the image capturing apparatus; an operation unit adapted to cause an operator to instruct the image capturing control unit to do image capturing; an image processing unit adapted to execute image processing upon receiving an image signal acquired by the image capturing apparatus; and a display unit adapted to display the image signal processed by the image processing unit.

According to the present invention, the foregoing object is attained by providing a control method of an image capturing apparatus having a solid-state image sensing element with sensitivity to X-rays, comprising steps of: converting a received X-ray signal into an image signal; and selecting, on the basis of an image capturing mode in the image capturing step, a communication interface to be used to output the image signal acquired in the image capturing step from at least two communication interfaces provided in the image capturing apparatus.

According to the present invention, the foregoing object is attained by providing a program which causes a computer to control an image capturing apparatus having a solid-state image sensing element with sensitivity to X-rays, the program causing the computer to execute steps of: converting a received X-ray signal into an image signal; and selecting, on the basis of an image capturing mode in the image capturing step, a communication interface to be used to output the image signal acquired in the image capturing step from at least two communication interfaces provided in the image capturing apparatus.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Preferred embodiments of the present invention will be described in detail in accordance with the accompanying drawings.

First Embodiment

Figure 1:
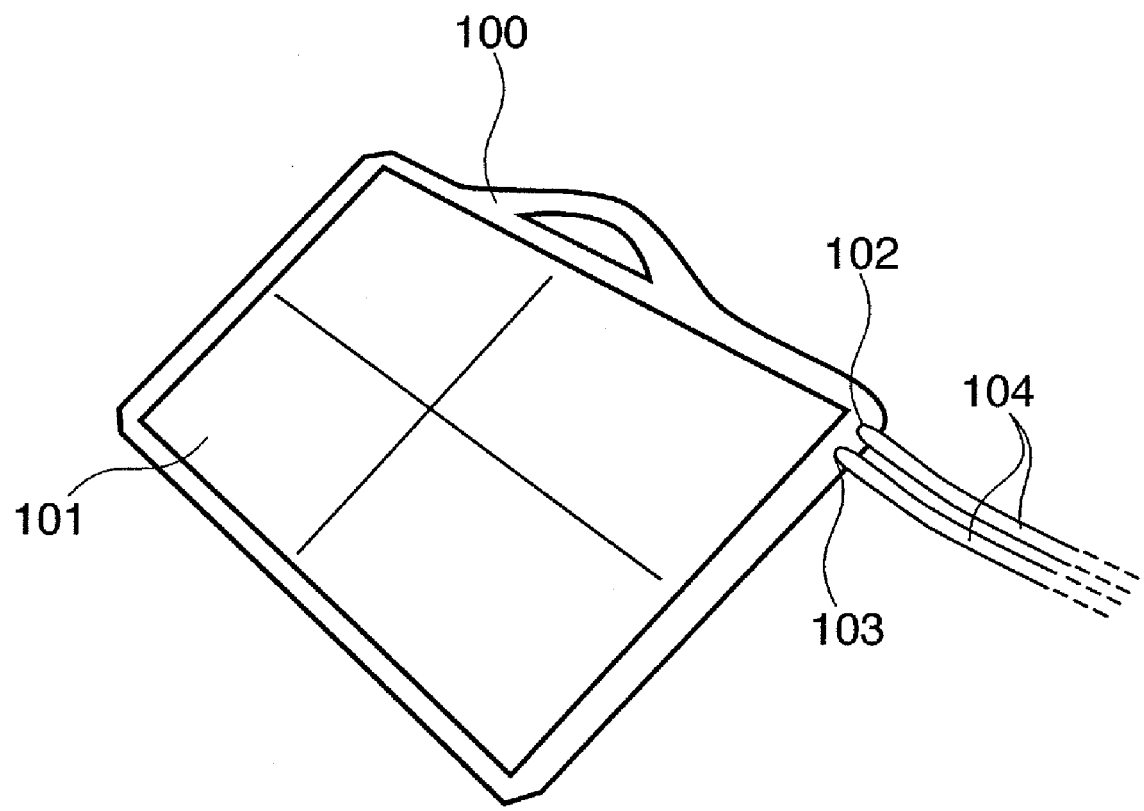
FIG. 1 is a view showing the outer appearance of an image capturing apparatus according to the first embodiment of the present invention.

FIG. 1 is a view showing the outer appearance of an image capturing apparatus according to the first embodiment of the present invention.

Reference numeral 100 denotes an X-ray sensor as the main body of an image capturing apparatus. The X-ray sensor 100 is arranged opposite to an X-ray generation unit so that X-ray imaging is executed by receiving X-rays transmitted through an object located between the X-ray sensor and the X-ray generation unit. An X-ray receiving unit 101 receives X-rays transmitted through an object and comprises, e.g., a solid-state image sensing element having sensitivity to X-rays.

A first connector 102 is used to attach a communication cable to output an image signal obtained by converting X-rays received by the X-ray receiving unit 101. A second connector 103 is also used to attach a communication cable to output an image signal. Communication cables 104 to transmit an image signal can be attached to or detached from the first connector 102 and second connector 103, respectively.

The X-ray sensor 100 can be connected to a host terminal through the communication cable 104. The host terminal may be connected to the X-ray generation unit. An image capturing system can be formed by the X-ray sensor 100, X-ray generation unit, and host terminal. In this case, an X-ray exposure instruction (image capturing) can be sent from the host terminal to the X-ray generation unit.

The functional arrangement of the image capturing apparatus according to the first embodiment will be described next with reference to FIG. 2.

Figure 2:
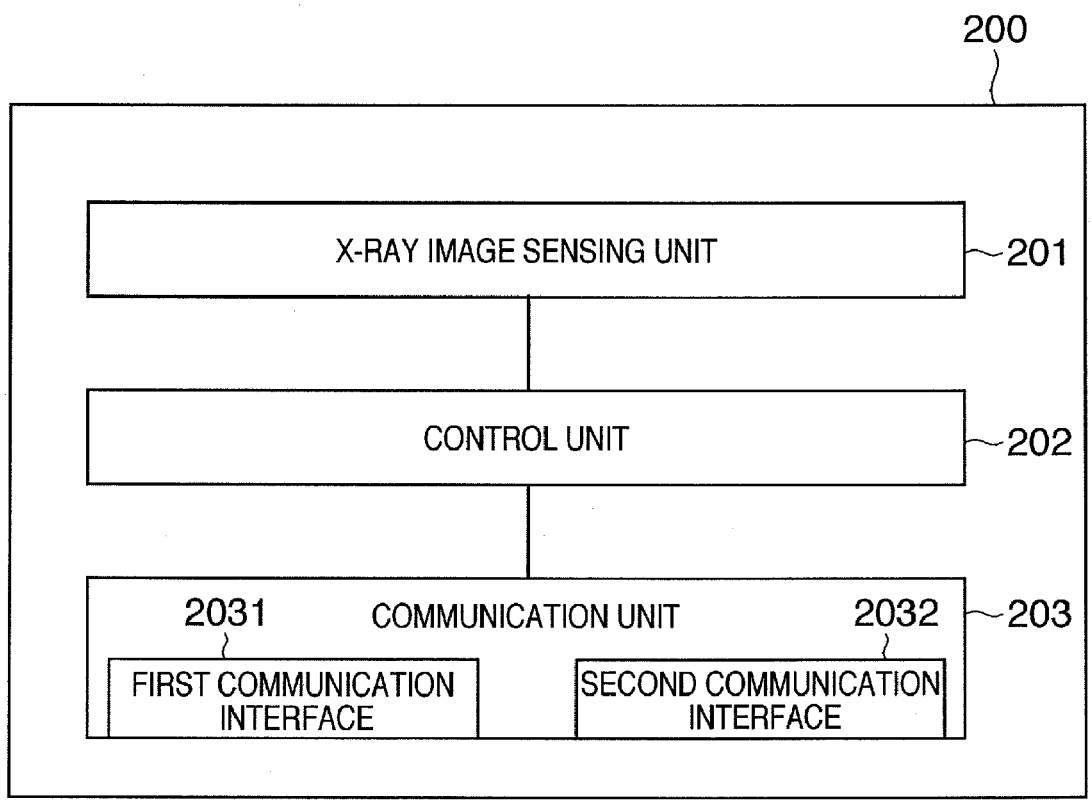
FIG. 2 is a block diagram showing the functional arrangement of the image capturing apparatus according to the first embodiment of the present invention.

FIG. 2 is a block diagram showing the functional arrangement of the image capturing apparatus according to the first embodiment of the present invention.

Reference numeral 200 denotes an X-ray sensor as an image capturing apparatus. The X-ray sensor 200 is equivalent to the X-ray sensor 100 in FIG. 1. An X-ray image sensing unit 201 receives X-rays transmitted through an object and converts the obtained X-ray signal into an image signal.

A control unit 202 executes various kinds of control related to image capturing such as drive of the X-ray image sensing unit 201 and transfer of an image signal acquired by the X-ray image sensing unit 201. A communication unit 203 outputs an image signal acquired by the X-ray image sensing unit 201. The communication unit 203 comprises a first communication interface 2031 and a second communication interface 2032 to output an image signal.

The first communication interface 2031 and second communication interface 2032 correspond to the first connector 102 and second connector 103 in FIG. 1, respectively.

A detailed example of the first communication interface 2031 and second communication interface 2032 is a serial interface such as a USB (1.0/2.0) interface or IEEE1394 interface. A network interface such as wireless LAN or Ethernet (10/100/100BASE-T) or an optical fiber may be used.

A communication interface of necessary communication standard is applied to the first communication interface 2031 and second communication interface 2032 in accordance with the application purpose or intention. For example, a communication interface with a first transfer rate can be applied to the first communication interface 2031, and a communication interface with a second transfer rate higher than the first transfer rate can be applied to the second communication interface 2032.

In this configuration, the first communication interface 2031 can be used for a still image that requires not so high a transfer rate, and the second communication interface 2032 is used for a moving image that requires a high transfer rate.

Image capturing processing of the image capturing apparatus according to the first embodiment will be described next with reference to FIG. 3.

Figure 3:
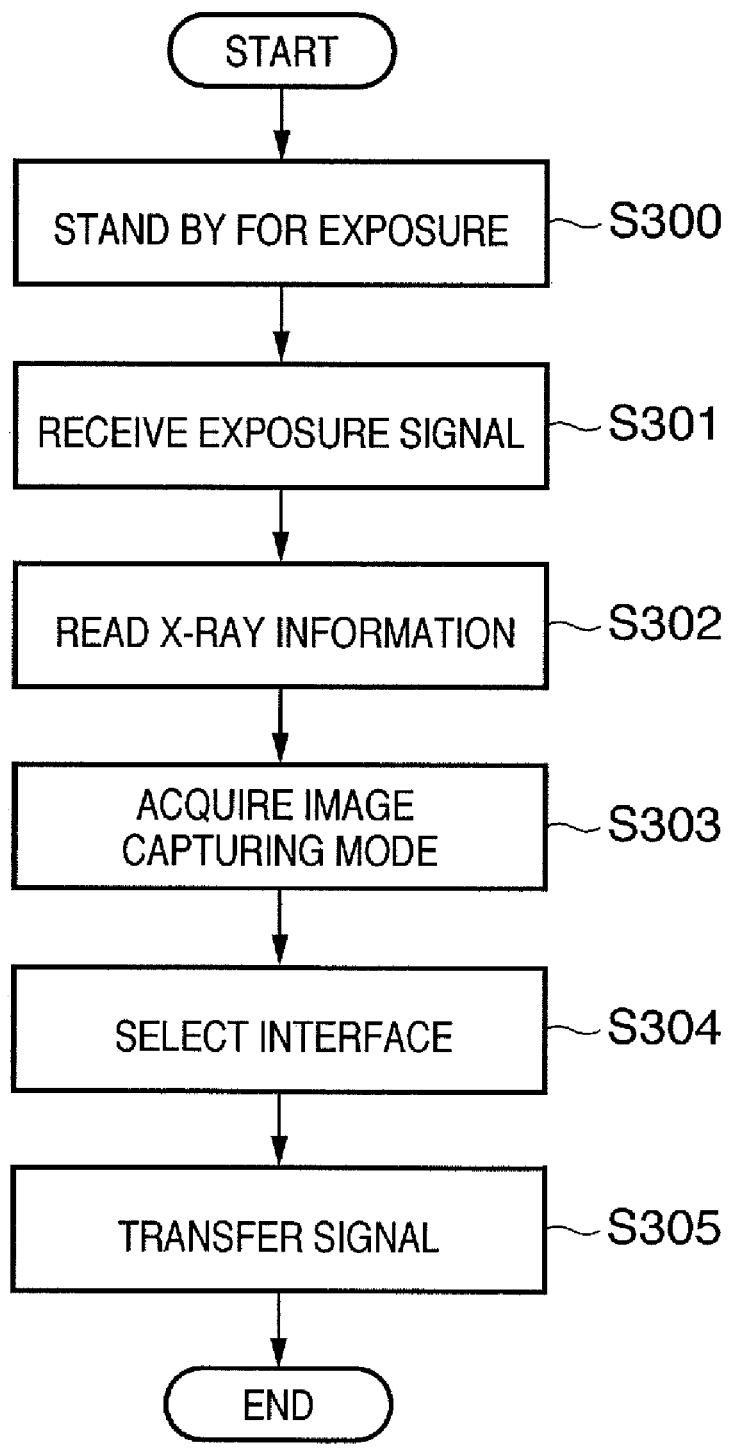
FIG. 3 is a flowchart showing image capturing processing of the image capturing apparatus according to the first embodiment of the present invention.

FIG. 3 is a flowchart showing image capturing processing of the image capturing apparatus according to the first embodiment of the present invention.

FIG. 3 shows processing of receiving transmitted X-rays from an object, converting the X-rays into an image signal, and outputting it. This processing is executed under the control of the control unit 202.

In step S300, X-ray reception standby, i.e., exposure standby is executed. In step S301, an exposure signal is received to start reading X-ray information representing transmitted X-rays. More specifically, when the operator inputs an X-ray exposure instruction to the X-ray generation unit by using an operation unit such as an exposure button on the X-ray sensor 100 or X-ray generation unit or a foot switch, an exposure signal is generated by the X-ray generation unit and received by the image capturing apparatus. Upon receiving the exposure signal, X-ray information reading starts, and the information is converted into an image signal in step S302.

In step S303, to decide a communication interface to be used for output, an image capturing mode is acquired. An image capturing mode indicates an X-ray imaging method and, more generally, a classification such as fluoroscopic image capturing/general image capturing or still image/moving image.

In step S304, a communication interface to be used for image data transfer is selected on the basis of the image capturing mode acquired in step S303.

In, e.g., a still image mode, the communication cable connected to the first connector 102 is used for image signal transfer. In a moving image mode, data is output by using the communication cable connected to the second connector 103.

The image capturing mode can be acquired on the basis of information designated by the operator at the time of image capturing. That is, the operator can set the image capturing mode by using an image capturing mode switch provided on the image capturing apparatus. Alternatively, image capturing mode setting information may be contained in a control signal from the operation unit of an external device (host terminal). When the image capturing apparatus receives the control signal, an image capturing mode is set on the basis of the image capturing mode setting information.

Any method can be used if it can set the image capturing mode. The image capturing mode setting method itself is not essential in the present invention.

In step S305, an image signal is output by using the communication interface selected in step S304.

A configuration example of an image capturing system using the image capturing apparatus according to the first embodiment will be described next with reference to FIG. 4.

Figure 4:
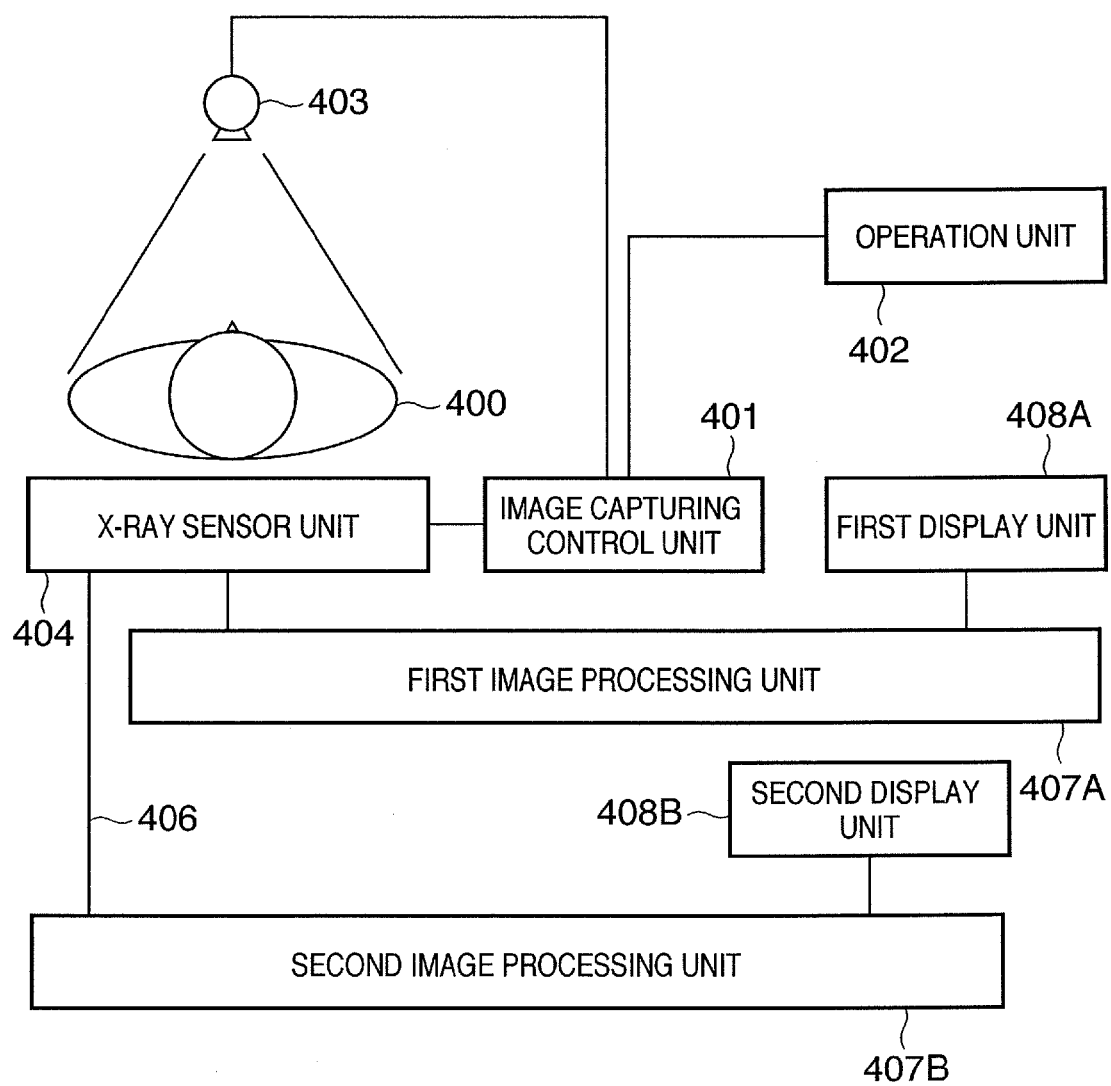
FIG. 4 is a block diagram showing a configuration example of an image capturing system according to the first embodiment of the present invention.

FIG. 4 is a block diagram showing a configuration example of an image capturing system according to the first embodiment of the present invention.

Especially in the configuration shown FIG. 4, two communication interfaces provided on the image capturing apparatus are connected to separate image processing units.

Reference numeral 400 denotes an object in X-ray imaging. An image capturing control unit 401 controls the image capturing apparatus and an X-ray generation unit 403 (X-ray generation device). An operation unit 402 executes various kinds of operations related to image capturing, including image capturing instruction and image capturing condition (e.g., image capturing mode) setting for the image capturing control unit 401. The X-ray generation unit 403 generates X-rays on the basis of a control signal transmitted from the image capturing control unit 401.

An X-ray sensor unit 404 receives X-rays emitted from the X-ray generation unit 403 and transmitted through the object 400 and converts the X-rays into an image signal. The X-ray sensor unit 404 is the image capturing apparatus itself. A first image processing unit 407A and a second image processing unit 407B receive the image signal acquired by the X-ray sensor unit 404 and execute image processing such as tone conversion and correction processing. Display units 408A and 408B display an image processed by the image processing units 407. Each display unit includes a general monitor such as a liquid crystal display or CRT.

The first image processing unit 407A and second image processing unit 407B are connected to the X-ray sensor unit 404 through the first communication interface 2031 and second communication interface 2032 in FIG. 2, respectively.

The operator arranges the X-ray sensor unit 404 and X-ray generation unit 403 and executes pre-image capturing setting such as image capturing part setting on the operation unit 402 such that an image capturing target part of the object 400 is captured by the X-ray sensor unit 404. When the operator instructs X-ray exposure (image capturing), the X-ray generation unit 403 emits X-rays. The X-ray sensor unit 404 receives the X-rays transmitted through the object 400.

The X-ray sensor unit 404 receives the transmitted X-rays, generates an image signal, and transfers the image signal from a first communication channel 405 or second communication channel 406 to the first image processing unit 407A or second image processing unit 407B. As described above, a data transfer cable of Ethernet or dedicated line can be used for these communication channels. The communication interface of the X-ray sensor unit 404 has a structure capable of attaching/detaching the cable.

The first image processing unit 407A and first display unit 408A can be constituent elements of, e.g., a fluoroscopic image processing workstation for processing a fluoroscopic image. To the contrary, the second image processing unit 407B and second display unit 408B can be constituent elements of, e.g., a captured image processing workstation for processing a captured image.

Referring to FIG. 4, an image signal obtained from the X-ray sensor unit 404 is transferred to the first image processing unit 407A through the first communication channel 405 and also to the second image processing unit 407B through the second communication channel 406. In this configuration, when fluoroscopic image capturing is executed by the X-ray sensor unit 404, the image can be transferred to the fluoroscopic image processing workstation. When general image capturing is executed, the image can be transferred to the captured image processing workstation.

In addition, when both communication interfaces are used for the same application purpose, a redundant system can be formed. In this case, instead of switching the communication interface in accordance with the image capturing mode, a signal image signal is transferred to the transfer destinations by using the plurality of communication interfaces. That is, both the first communication channel 405 and second communication channel 406 transfer the same image signal so that the same image can be seen on the plurality of monitors.

When this use method is employed, the operator must notify (by indicator information or sound information) the X-ray sensor unit 404 that an image signal acquired by the X-ray sensor unit 404 should be transmitted simultaneously to the transfer destinations by using a plurality of communication interfaces. Setting for this notification can be done from, e.g., the operation unit 402 or by using a setting unit such as a switch for the X-ray sensor unit 404 in advance.

In the first embodiment, two image processing units (workstations) are connected to the image capturing apparatus, for the sake of simplicity. However, the number of communication interfaces of the image capturing apparatus serving as the X-ray sensor unit is not limited to two. That is, image processing units equal in number to the communication interfaces of the X-ray sensor unit 404 can be connected.

As described above, according to the first embodiment, since the image capturing apparatus has a plurality of communication interfaces, the configuration related to transfer of an image captured by the image capturing apparatus can flexibly be changed in accordance with the application purpose or intention.

Second Embodiment

In the first embodiment, an arrangement for adaptively switching the communication interface used in the image capturing apparatus in accordance with the image capturing mode has been described. However, the present invention is not limited to this.

For example, a first communication interface 2031 may be used as an image output interface when at least a predetermined number of images (e.g., 30 images per sec) are obtained by image capturing, and a second communication interface 2032 may be used when the number of images is smaller than the predetermined number.

That is, the communication interface may be selected in accordance with the number of images acquired by an X-ray sensor 200 per unit time.

In general fluoroscopic image capturing, several ten images are acquired per sec. For this reason, when 20 or more image data are obtained per sec, the image capturing mode is determined as fluoroscopic image capturing. When the number of obtained image data is smaller than 20, the mode is determined as general image capturing so that the communication interface can selectively be used.

In this case, a high-speed communication interface is selected for transfer of fluoroscopic images, and a low-speed communication interface is selected for transfer of general captured images so that the load on communication can effectively be distributed. Alternatively, the two communication interfaces may be used simultaneously for fluoroscopic image transfer, and one communication interface may be used for general captured image transfer.

The threshold value of the image count to be used to determine fluoroscopic image capturing and general image capturing can be either held in the image capturing apparatus in advance or arbitrarily set by the user through the operation unit. The threshold value may be set by a dedicated setting unit provided on an X-ray sensor 100 or by causing the image capturing apparatus to receive a setting signal from an external device. That is, any method can be used if it can set the threshold value.

As described above, according to the second embodiment, in addition to the effect described in the first embodiment, the communication interface can adaptively be selected in accordance with the number of images acquired per unit time.

Third Embodiment

In the second embodiment, an arrangement for switching the interface in accordance with the number of images acquired per unit time of image capturing has been described. However, the present invention is not limited to this.

For example, the communication interface may be selected in accordance with the size of image data acquired by an X-ray sensor 200 or the amount of data (pixel rate) acquired per unit time.

More specifically, when an image with a data size equal to or more than a threshold value is acquired, the first communication interface is used. When an image with a data size less than the threshold value is acquired, the second communication interface is used.

Generally, the data size is smaller in a fluoroscopic image than in a general captured image. Hence, if the data size of image data obtained by image capturing is, e.g., 5 Mbyte or more, the image is determined as a general captured image. When the data size is smaller than 5 Mbyte, the image is determined as a fluoroscopic image so that the communication interface for data transfer can selectively be used.

One communication interface may be used to transfer a fluoroscopic image, and two communication interfaces may be used simultaneously to transfer a general captured image.

If the pixel rate is used for determination, the communication interface to be used may be selected in accordance with the data acquisition amount per unit time, i.e., depending on whether the data acquisition amount per sec is 2 Mbyte or more. The threshold value of the data size or pixel rate to be used to determine fluoroscopic image capturing and general image capturing can be either held in the image capturing apparatus in advance or arbitrarily set by the user through the operation unit.

As described above, according to the third embodiment, in addition to the effect described in the first embodiment, the communication interface can adaptively be selected in accordance with the size of image data acquired per unit time.

Fourth Embodiment

When a plurality of communication interfaces of an X-ray sensor 100 are connected to one image processing unit, and communication on the communication channel is disconnected or the communication cable is removed, data transfer may be executed by immediately switching the communication channel to a usable one.

If communication using one communication interface is disconnected due to, e.g., removal of the communication cable, a control unit 202 of an X-ray sensor 200 may immediately interrupt image capturing and stop the exposure signal to the X-ray generation unit. Even if image capturing becomes impossible, unnecessary exposure can be prevented. In this case, if the system is designed to retransmit already transferred data immediately before switching the communication channel, the data can more reliably be transmitted. The retransfer data only need to have a data amount to be transferred in one cycle.

As described above, according to the fourth embodiment, in addition to the effect described in the first embodiment, the fault tolerance of the system can be improved, and a failsafe system can be implemented.

Fifth Embodiment

In the fifth embodiment, an arrangement having a wire communication interface and a wireless communication interface as communication interfaces of an X-ray sensor 100 serving as an image capturing apparatus will be described. For example, assume that a first communication interface 2031 in FIG. 2 is a wire communication interface, and a second communication interface 2032 is a wireless communication interface.

This image capturing apparatus can selectively use the wire communication and wireless communication in accordance with the above-described image capturing mode or the image acquisition count, data amount, or image data size per unit time.

The operation of the image capturing apparatus according to the fifth embodiment will be described below with reference to FIG. 5.

Figure 5:
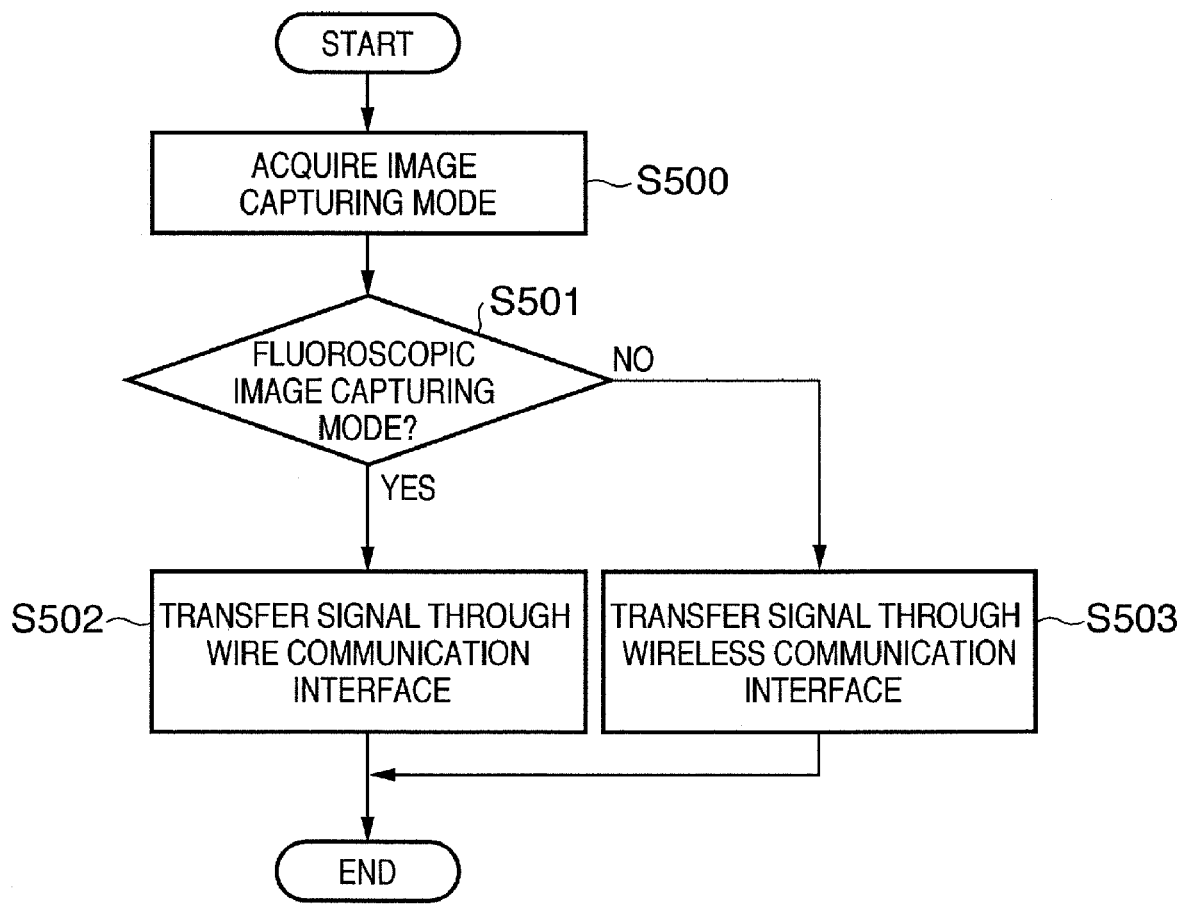
FIG. 5 is a flowchart showing the operation of an image capturing apparatus according to the fifth embodiment of the present invention.

FIG. 5 is a flowchart showing the operation of the image capturing apparatus according to the fifth embodiment of the present invention.

In step S500, the image capturing mode is acquired. The image capturing mode indicates a classification such as fluoroscopic image capturing/general image capturing or still image/moving image, as described above. In step S501, it is determined whether the image capturing mode acquired in step S500 is the fluoroscopic image capturing mode. If the mode is determined as the fluoroscopic image capturing mode (YES in step S501), the flow advances to step S502 to output an image signal by using the wire communication interface (first communication interface 2031).

If the mode is determined not to be the fluoroscopic image capturing mode (NO in step S501), the flow advances to step S503 to output an image signal by using the wireless communication interface. In this case, if wire communication becomes unusable due to some reason, fluoroscopic image capturing is preferably unusable even when wireless communication is possible. That is, when it is determined in the X-ray sensor 100 that the wire communication interface cannot be used, unwanted exposure of the subject can be prevented by inhibiting exposure of the X-ray generation unit.

To determine the usable state, the control unit 202 determines on the basis of the attached state of the communication cable connected to, e.g., the wire communication interface whether the wire interface can be used. On the basis of the determination result, the image capturing operation of the X-ray sensor 100 including exposure of the X-ray generation unit is inhibited.

The wire communication and wireless communication may selectively be used as needed independently of the image capturing mode. For example, in a mobile X-ray imaging apparatus used in round of visits, the X-ray sensor 100 may be inserted between a patient and the bed in a small sickroom. Hence, image capturing is executed using the wireless communication interface for easy cable management. On the other hand, fluoroscopic image capturing in an operating room may be done by using the wire communication interface in consideration of the image transfer speed.

The X-ray sensor 200 of this image capturing system has a structure capable of attaching the communication cables at the communication interface units (first communication interface 2031 and second communication interface 2032). For this reason, any X-ray imaging apparatus such as a mobile X-ray imaging apparatus, fluoroscopic imaging apparatus, or general imaging apparatus can be used independently of the image capturing system.

As described above, according to the fifth embodiment, in addition to the effect described in the first embodiment, the communication interface can adaptively be selected in accordance with the image capturing environment (e.g., sickroom and operating room).

Sixth Embodiment

In X-ray imaging, a radio wave generated from a wireless device may affect medical equipment such as a patient's pacemaker and defibrillator. When a wireless module that generates a radio wave is arranged at a predetermined distance from an object or medical equipment, communication can be done without any influence on the medical equipment such as a patient's pacemaker.

Figure 6:
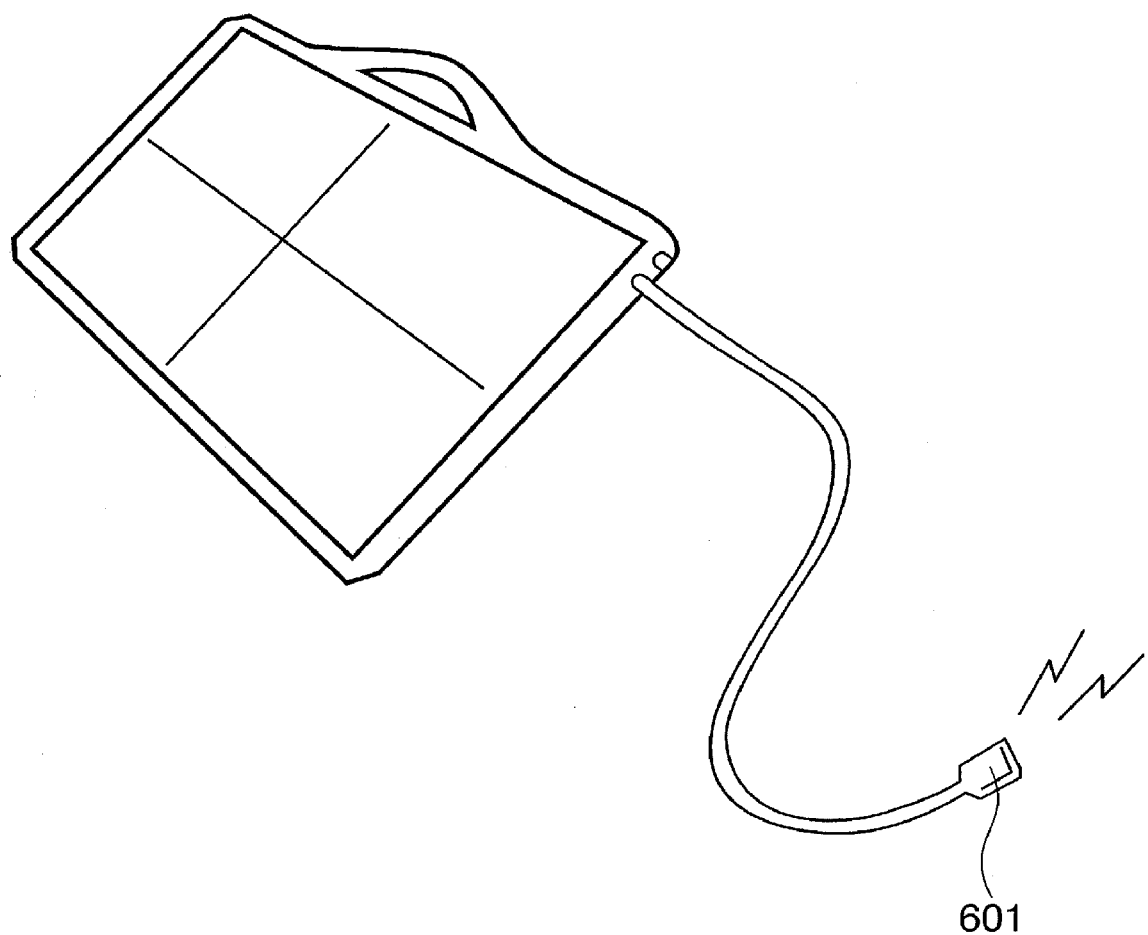
FIG. 6 is a view showing the arrangement of an image capturing apparatus having a wireless module according to the sixth embodiment of the present invention.

FIG. 6 shows an example of a communication interface that has a wireless module 601 incorporated in an end of a cable with a predetermined length. When the structure shown in FIG. 6 is employed, wireless communication can be used without difficulty in managing the communication cable.

As described above, according to the sixth embodiment, in addition to the effect described in the first embodiment, a more secure communication environment can be provided.

Seventh Embodiment

The above-described first to sixth embodiments are merely examples. Another embodiment can be implemented by arbitrarily combining them in accordance with the application purpose or intention.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Application No. 2005-228476, filed Aug. 5, 2005, which is hereby incorporated by reference herein in its entirety.

What is claimed is:

1. An image capturing apparatus having a solid-state image sensing element with sensitivity to X-rays, comprising:
    image sensing means for receiving X-rays and converting the received X-ray signal into an image signal;
    control means for controlling the image capturing apparatus, including image capturing using said image sensing means;
    communication means including at least two communication interfaces to output the image signal acquired by said image sensing means;
    setting means for setting an image capturing mode; and
    switching means for switching the communication interface to be used to output the image signal in said communication means in accordance with the image capturing mode set by said setting means.

2. The apparatus according to claim 1, further comprising threshold value setting means for setting a threshold value, and
    wherein said switching means switches the communication interface to be used to output the image signal in said communication means in accordance with comparison between the threshold value set by said threshold value setting means and an amount of data acquired by said image sensing means per unit time.

3. The apparatus according to claim 1, further comprising threshold value setting means for setting a threshold value, and
    wherein said switching means switches the communication interface to be used to output the image signal in said communication means in accordance with comparison between the threshold value set by said threshold value setting means and the number of images acquired by said image sensing means per unit time.

4. The apparatus according to claim 1, wherein the communication interface includes at least one wire communication interface and at least one wireless communication interface.

5. The apparatus according to claim 4, wherein
    said communication means has a structure capable of attaching a communication cable to the wire communication interface, and
    said control means comprises
    determination means for determining on the basis of an attached state of the communication cable connected to the wire communication interface whether the wire interface can be used, and
    inhibition means for inhibiting image capturing by said image sensing means on the basis of a determination result from said determination means.

6. The apparatus according to claim 4, wherein a wireless module of the wireless communication interface has a structure capable of executing wireless communication while maintaining a predetermined distance from an object of the image capturing apparatus.

7. The apparatus according to claim 1, wherein when communication is disconnected during use of one communication interface in said communication means, said control means switches the communication interface to the other communication interface.

8. An image capturing system comprising an image capturing apparatus of claim 1, comprising:
    an X-ray generation unit adapted to irradiate an object with X-rays;
    an image capturing control unit adapted to control said X-ray generator and said image capturing apparatus;
    an operation unit adapted to cause an operator to instruct said image capturing control unit to do image capturing;
    an image processing unit adapted to execute image processing upon receiving an image signal acquired by said image capturing apparatus; and
    a display unit adapted to display the image signal processed by said image processing unit.

9. A control method of an image capturing apparatus having a solid-state image sensing element with sensitivity to X-rays, comprising steps of:
    converting a received X-ray signal into an image signal;
    setting an image capturing mode; and
    selecting, on the basis of an image capturing mode in the setting step, a communication interface to be used to output the image signal acquired in the converting step from at least two communication interfaces provided in the image capturing apparatus.

10. A computer-readable medium storing a program which causes a computer to control an image capturing apparatus having a solid-state image sensing element with sensitivity to X-rays, the program causing the computer to execute steps of:
    converting a received X-ray signal into an image signal;
    setting an image capturing mode; and
    selecting, on the basis of an image capturing mode in the setting step, a communication interface to be used to output the image signal acquired in the converting step from at least two communication interfaces provided in the image capturing apparatus.

* * * * *